United States Patent [19]

Schierjott

[11] Patent Number: 4,514,679
[45] Date of Patent: Apr. 30, 1985

[54] SECONDARY SWITCH CONTROLLER CIRCUIT FOR POWER SUPPLY

[75] Inventor: Rudolf Schierjott, Munich, Fed. Rep. of Germany

[73] Assignee: Siemens Aktiengesellschaft, Berlin & Munich, Fed. Rep. of Germany

[21] Appl. No.: 476,417

[22] Filed: Mar. 17, 1983

[30] Foreign Application Priority Data

Apr. 15, 1982 [DE] Fed. Rep. of Germany ....... 3213869

[51] Int. Cl.³ .......................... G05F 1/64; H02P 13/32
[52] U.S. Cl. ...................................... 323/222; 323/285
[58] Field of Search .................... 323/222; 363/20, 21, 363/79, 80; 323/285, 286, 287

[56] References Cited

U.S. PATENT DOCUMENTS

| 3,671,853 | 6/1972 | Weischedel et al. | 323/285 |
| 4,322,787 | 3/1982 | Kraus | 323/222 |
| 4,326,245 | 4/1982 | Saleh | 323/17 |

OTHER PUBLICATIONS

Tietze and Schenk, Halbleiterschaltungstechnik, 5th Edition, Section 16.5.1 (pp. 391-396).

Primary Examiner—William H. Beha, Jr.
Assistant Examiner—Jeffrey Sterrett
Attorney, Agent, or Firm—Hill, Van Santen, Steadman & Simpson

[57] ABSTRACT

A secondary switch controller has an input circuit with an inductance and a semiconductor switch and an output circuit with a rectifier and a smoothing element. A circuit for controlling operation of the secondary switch includes an internal control loop responsive to the voltage at the inductance, an external control loop responsive to the output voltage, and a current limiting circuit responsive to the current flowing through the input circuit.

6 Claims, 5 Drawing Figures

SECONDARY SWITCH CONTROLLER CIRCUIT FOR POWER SUPPLY

BACKGROUND OF THE INVENTION

1. Field of the Invention

The present invention relates to a switching power supply, and particularly to a secondary switch controller adapted to derive an output voltage which is different from an input voltage.

2. The Prior Art

Secondary switch controllers of the type to which the present invention belongs are typically employed for generating a controlled DC voltage from an uncontrolled DC voltage. In a special application, the output DC voltage is higher than the input DC voltage. The circuit employs an inductance and a switching transistor connected in series, with the switching transistor being alternately fully driven and cut off. The output voltage is made available at a tap between the inductance and the switching transistor, and is connected through a diode to a smoothing capacitor.

As described in *Tietze and Schenk, Halbleiterschaltungstechnik*, 5th Edition, Chapter 16.5.1 a switching transistor may be operated with a constant frequency drive signal. The pulse duty factor of the drive signal is controlled, i.e., the ratio of the on time to the frequency, so that the output voltage corresponds to a reference voltage. The disadvantage of this circuit is that a reference voltage is required, and a control circuit having a fixed frequency is also required. As a result of these requirements, relatively large switching losses can occur.

BRIEF DESCRIPTION OF THE PRESENT INVENTION

A principal object of the present invention is to provide a circuit for a secondary switch controller in which only a few simple components are required, and only small switching losses are realized.

A further object of the present invention is to provide a circuit which can effectively employ a relatively inexpensive VHF choke for the inductance.

Another object of the present invention is to provide a circuit which is fast acting, to compensate rapidly for changes in load, or fluctuations in input voltage.

A further object of the present invention is to provide a circuit in which no auxiliary voltages are required.

In one embodiment of the present invention there is provided a circuit having a series connected inductance and semiconductor switch, with a diode connected from the junction of the inductance and semiconductor switch to a smoothing element, the semiconductor switch being controlled by a first internal control circuit responsive to the voltage level at the inductance, a second external control circuit responsive to the voltage level at the output, and a third current control circuit responsive to the input current.

By means of the present invention, the above objects are realized.

Other objects and advantages of the present invention will become manifest by an examination of the following description and the accompanying drawings.

BRIEF DESCRIPTION OF THE DRAWINGS

Reference will now be made to the accompanying drawings in which.

DESCRIPTION OF THE PREFERRED EMBODIMENT

Figure 1:
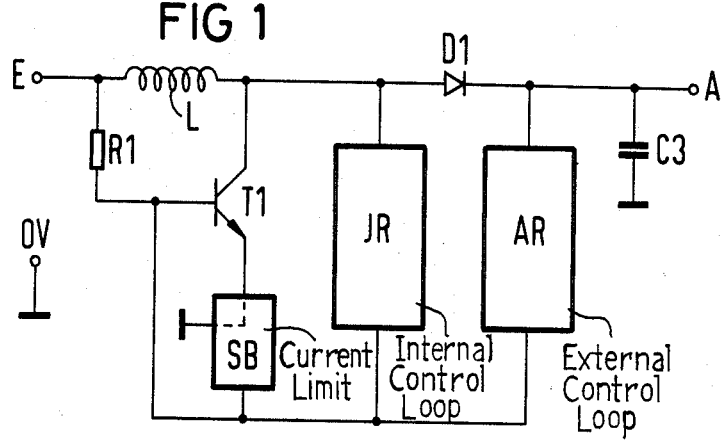
FIG. 1 is a functional block diagram of an illustrative embodiment of the present invention.

Referring first to FIG. 1, a secondary switch controller incorporating an illustrative embodiment of the present invention is illustrated. An inductance L is connected in series with a semiconductor switch T1. The junction of the inductance and the switch is connected by means of a diode D1 to one terminal of a smoothing capacitor C3 and to an output terminal A. An input terminal E is connected to the free end of the inductance. A resistor R1 is connected from the input terminal to the base of the semiconductor switch T1, and serves to render the switch T1 conductive upon application of a voltage to the input E. An internal control loop IR has its input connected to the output of the inductance L, and functions to control the switch element T1 in accordance with that voltage. An external control loop AR has its input terminal connected to the output terminal A, and functions to control the switch element T1 in accordance with that voltage. A current limit circuit SB, connected in series with the switch element T1, functions to control the switch element T1 in accordance with the current flowing between the switch element T1 and ground potential.

Figure 2:
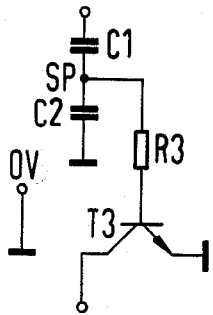
FIG. 2 is a schematic circuit diagram of an internal control loop.

FIG. 2 illustrates a schematic diagram of a circuit which may be employed as the internal control loop IR. It consists of a capacitive voltage divider C1 and C2, connected between the output of the inductance L and ground, with the junction point SP between the two capacitors connected by resistor R3 to the base or control input of a semiconductor control element T3. The element T3 is adapted to be connected between the control input of the switching device T1 and ground, for selectively cutting off the switching unit T1. When the voltage at the output of the inductance L, corresponding to the input of the internal control loop IR, sinks below a predetermined value, the voltage at the control input of the semiconductor control element T3 is lower, tending to cut off the element T3, thereby permitting the switching unit T1 to conduct again. The limiting value at which this occurs is determined by the value of the resistor R3 and by the cut-off voltage of the control unit.

Figure 3:
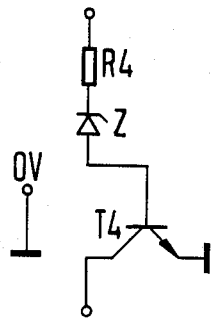
FIG. 3 is a schematic circuit diagram of an external control loop.

FIG. 3 illustrates a schematic diagram of the external control loop AR. Its input is connected to the output terminal A, and the input is connected through a resistor R4 and a Zener diode Z to the control input of a semiconductor control element T4. The control element T4 is connected in the same way as the control element T3 illustrated in FIG. 2. When the voltage at the output terminal A exceeds a specific limiting value, the semiconductor control element T4 is made conductive, thereby cutting off the semiconductor switch unit T1. The limiting voltage at which this occurs is determined by the resistor R4 and Zener voltage of the Zener diode Z, as well as the input resistance of the control element T4.

Figure 4:
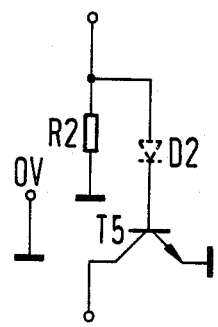
FIG. 4 is a schematic circuit diagram for a current limit circuit.

FIG. 4 illustrates a schematic circuit diagram of a current limit circuit SB. It incorporates a resistor R2 which is connected in series with the semiconductor switch unit T1 and ground. An optional diode D2 is connected from the input of this circuit to the control input of a semiconductor control element T5, which is connected in parallel with the semiconductor control elements T3 and T4, illustrated in FIGS. 2 and 3. When the current through the resistor R2 exceeds a specific limiting value, the control element T5 is switched on, thereby cutting off the semiconductor switch unit T1. The limiting current value is determined by the resistor R2, the voltage through the diode D2, and the input resistance of the control unit. When the circuit of FIG. 4 is employed for the current limit circuit SB, the diode D2 is not required, but the diode is required when a single semiconductor control element is used in place of two or three of the control elements T3–T5 illustrated in FIGS. 2–4.

The control elements T3–T5 are preferably switching and control transistors, with their control elements being their bases.

Figure 5:
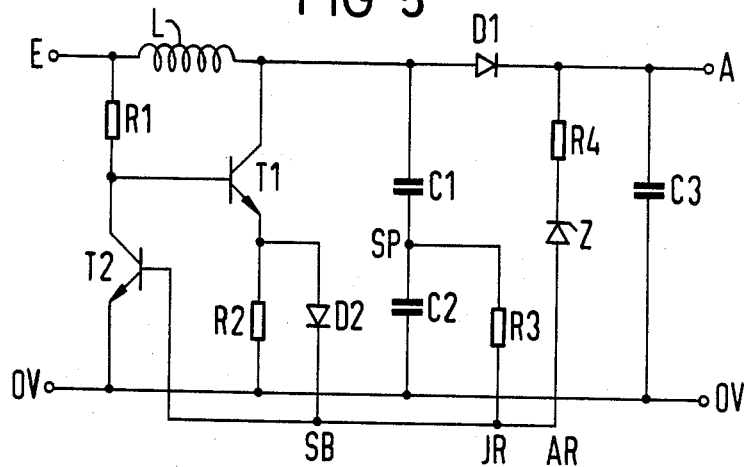
FIG. 5 is a schematic circuit diagram of an illustrative embodiment of the present invention.

FIG. 5 illustrates a schematic circuit diagram in which the three semiconductor switch elements T3–T5 are replaced by single semiconductor switch element T2. The internal control loop IR, the external control loop AR, and the current limit circuit SB are all connected to control operation of the control transistor T2.

When a voltage is supplied to the input E, the rising voltage is conveyed over the resistor R1 to the base of the switching transistor T1, thereby switching it on. The control transistor T2 is blocked at this time, since neither the internal control loop IR nor the external control loop AR, nor the current limit SB cause a turn-on voltage to be applied to the base of the control transistor T2. The switching transistor T1 causes the current through the inductance L and resistor R2 to rise linearly, and after a specific limiting value of the current has been reached, the voltage drop across the resistor R2 is sufficient to cause the diode D2 to forward a voltage to the base of the control transistor T2, thereby turning it on. The voltage at the base of the switching transistor T1 thereby decreases and the transistor T1 is turned off. Subsequently, the voltage at the collector of the switching transistor T1 rises to a value above the level of the input voltage, and the energy stored in the inductance L is supplied to to the output A in the form of electrical current, charging the capacitor C3 through the diode D1. When the energy in the inductance L has been dissipated, the voltage at the output of the inductor falls, so that the voltage at the voltage divider point SP of the internal control loop IR also falls. This brings down the voltage at the base of the control transistor T2, since the base of the transistor T2 is connected to the point SP through the resistor R3. The effect of this is that the control transistor T2 is cut off, allowing the voltage at the base of the switching transistor T1 to rise again, switching on the switching transistor T1, and again charging the inductance L with energy.

The steps described above are repeated in sequence thereby charging up the capacitor C3. After a few cycles, the output voltage at the output terminal A reaches a specific value which is large enough to cause the Zener diode Z to conduct, thereby forwarding a voltage to the base of the control transistor T2. The control transistor T2 is thereby switched on, cutting off the switching transistor T1. As a result of this operation, the energy flowing through the inductance L during each switch cycle is limited to that required for maintaining the voltage at the output terminal A.

The operating frequency of the circuit of FIG. 5 is determined by the inductance L and the capacitors C1 and C2. It normally lies between 20 kHz. and 100 kHz. In one example, the inductance L has the value of 2 mH and the capacitors C1 and C2 are each 4.7 nF. With no load connected to the output terminal A, the circuit operates at a frequency of 40 kHz.

In a steady-state condition, the capacitive voltage divider C1 and C2 causes the switching transistor T1 to be cut-in at low voltage and low current, so that losses are largely avoided. The switching transistor T1 operates in non-saturated condition, since its base current, supplied through the resistor R1, is lower than the current required for saturation. This makes it possible for the control transistor T2 to rapidly clear the charge carriers from the switching transistor T1, making for rapid switching and extremely low switching losses.

The current limit circuit SB provides good protection against overload conditions which may be present at the output terminal A.

By the foregoing, it will be apparent to those skilled in the art that the present invention provides a simple and inexpensive secondary switching circuit which realizes extremely low switching losses. It will be apparent to those skilled in the art that various modifications and additions may be made to the apparatus of the present invention without departing from the essential features of novelty thereof, which are intended to be defined and secured by the appended claims.

What is claimed is:

1. In a seconday switch controller having an input circuit with an inductance and a semiconductor switch element and an output circuit with a rectifier and a smoothing element, the combination comprising; an internal control loop connected to said inductance and responsive to the voltage at said inductance for producing a first signal, an external control loop connected to said output circuit and responsive to the voltage at said rectifier for producing a second signal, and a current limit circuit connected to said input circuit and responsive to the current therethrough for producing a third signal, said internal control loop comprising a capacitive voltage divider including two capacitors in series with a tap there between said current limit circuit having a first semiconductor control element connected to said semiconductor switch element, and including a diode connecting said first semiconductor control element to said semiconductor switch element, means for connecting said first semiconductor control element to said capacitive voltage divider, and means for connecting said semiconductor control element to said external control loop.

2. Apparatus according to claim 1, wherein said internal control loop further comprises a second semiconductor control element, and a resistor connected between said voltage divider and said second semiconductor control element, whereby said second semiconductor control element is driven in response to the voltage at said tap of said capacitive voltage divider.

3. Apparatus according to claim 1, wherein said inductance comprises a VHF choke.

4. Apparatus according to claim 1, wherein said means for driving said semiconductor switch element periodically turns on and cuts off said semiconductor switch element at a frequency which is a function of the load applied to said output circuit.

5. Apparatus according to claim 1, wherein said current limiting circuit further comprises a resistor connected to said first semiconductor control element, whereby said first semiconductor control element is driven in accordance with the voltage drop across said resistor.

6. Apparatus according to claim 1, wherein said means for driving said semiconductor switch element comprises a single common semiconductor control element connected to receive said first, second and third signals, and including a diode for supplying said third signal to said common semiconductor control element.

* * * * *